(12) United States Patent
Bryant

(10) Patent No.: US 8,429,891 B2
(45) Date of Patent: Apr. 30, 2013

(54) ANTI-ICING SYSTEM USING RADIANT INFRARED ENERGY FROM TURBINE EXHAUST FLUES

(75) Inventor: Paul Sherwood Bryant, Amesbury (GB)

(73) Assignee: General Electric Company, Schenectady, NY (US)

( * ) Notice: Subject to any disclaimer, the term of this patent is extended or adjusted under 35 U.S.C. 154(b) by 352 days.

(21) Appl. No.: 12/639,685

(22) Filed: Dec. 16, 2009

(65) Prior Publication Data

US 2011/0138770 A1    Jun. 16, 2011

(51) Int. Cl.
*B64D 15/04* (2006.01)
*F02G 3/00* (2006.01)

(52) U.S. Cl.
USPC ................... 60/39.093; 244/134 R

(58) Field of Classification Search ............... 60/39.091, 60/39.092, 39.093, 39.52, 39.5; 244/134 R, 244/134 B
See application file for complete search history.

(56) References Cited

U.S. PATENT DOCUMENTS

| | | | | |
|---|---|---|---|---|
| 2,630,965 A * | 3/1953 | Greatrex et al. | ............. | 415/115 |
| 2,634,049 A * | 4/1953 | Hodges et al. | ................ | 415/178 |
| 2,636,666 A * | 4/1953 | Lombard | ........................ | 55/306 |
| 3,298,637 A * | 1/1967 | Lee | ............................. | 244/53 B |
| 3,925,979 A | 12/1975 | Ziegler | | |
| 4,240,250 A * | 12/1980 | Harris | ......................... | 60/39.093 |
| 4,328,666 A | 5/1982 | Cummins, Jr. | | |
| 4,543,785 A * | 10/1985 | Patrick | ............................. | 60/263 |
| 4,860,534 A | 8/1989 | Easley et al. | | |
| 4,941,317 A | 7/1990 | Ivey et al. | | |
| 5,083,423 A * | 1/1992 | Prochaska et al. | ............. | 60/772 |
| 5,423,174 A | 6/1995 | Mouton | | |
| 6,766,636 B2 * | 7/2004 | Shingu et al. | ............. | 60/39.092 |
| 7,926,256 B2 * | 4/2011 | Draper et al. | ................ | 60/39.52 |
| 2010/0313542 A1 * | 12/2010 | Bansa et al. | ............... | 60/39.092 |

FOREIGN PATENT DOCUMENTS

| | | |
|---|---|---|
| EP | 0357173 A1 | 3/1990 |
| GB | 2136880 A1 | 9/1984 |
| GB | 2147364 A1 | 5/1985 |
| GB | 2447228 A1 | 9/2008 |
| JP | 2002174128 A1 | 6/2002 |
| RU | 2210679 C2 | 8/2003 |

OTHER PUBLICATIONS

Infrared Heat for Gas Fired Turbines; Press Release; Mar. 2009; 4 pages.

* cited by examiner

*Primary Examiner* — Gerald Sung

(74) *Attorney, Agent, or Firm* — Armstrong Teasdale LLP

(57) ABSTRACT

An exhaust flue is provided for use with a gas turbine engine. The exhaust flue is oriented to channel exhaust gases from a core engine of the gas turbine engine. The exhaust flue includes a radiating portion positioned within an air inlet of the gas turbine engine. The radiating portion is oriented to emit infrared radiation towards an air filter assembly within the air inlet.

18 Claims, 3 Drawing Sheets

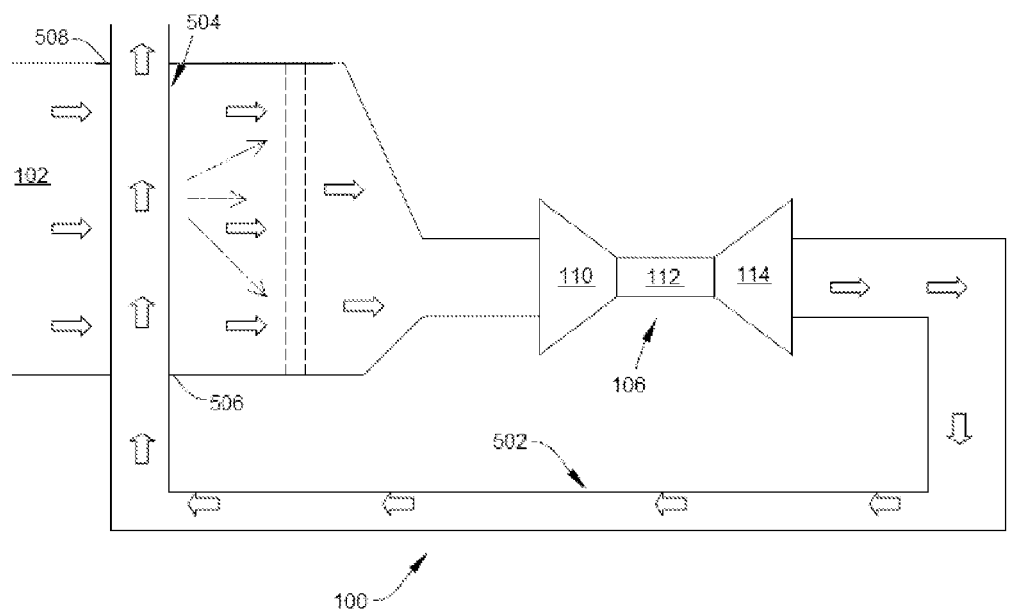
FIG. 5
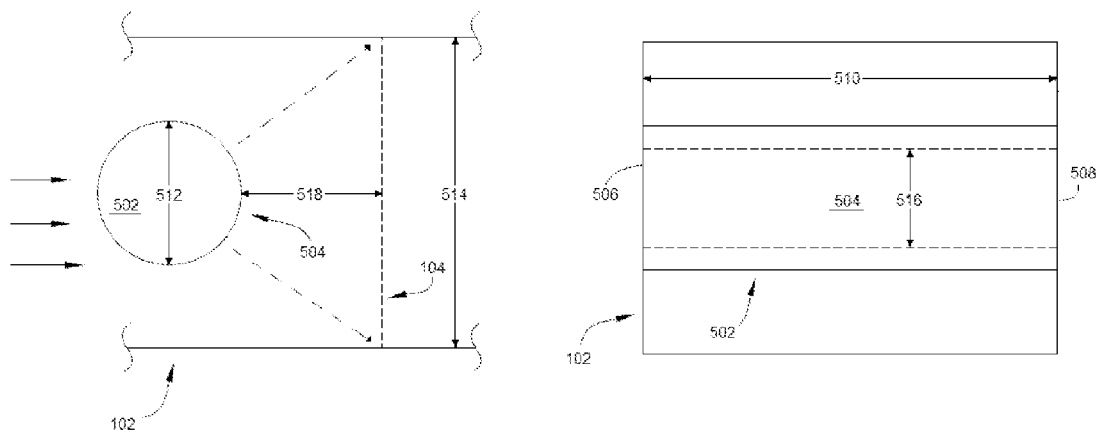
FIG. 6
FIG. 7

ANTI-ICING SYSTEM USING RADIANT INFRARED ENERGY FROM TURBINE EXHAUST FLUES

BACKGROUND OF THE INVENTION

The subject matter disclosed herein relates generally to gas turbine engines and, more particularly, to an anti-icing system for use with a gas turbine engine.

Known gas turbine engines include an air inlet, a core engine, and an exhaust flue. Known core engines include a compressor, a plurality of combustors, and a turbine. The air inlet channels intake air into the compressor. At least some known air inlets include an air filter assembly that filters the intake air to facilitate protecting the core engine from articles entrained in the intake air flow. The core engine produces exhaust gases that are discharged from the turbine via the exhaust flue at a temperature that is higher than a temperature of at least some of the intake air.

Within at least some known gas turbine engines, the formation of ice within the air inlet may disrupt airflow and adversely impact engine performance and efficiency and, if dislodged, may damage engine components. To prevent ice buildup, at least some known turbines channel compressed air from the compressor to the air inlet by heating the air inlet via cross-flow heat exchangers and/or by using a lamp assembly to emit infrared radiation within the air inlet. However, such methods generally reduce mass flow, reduce turbine operating pressure, and/or require additional energy input. Accordingly, a more efficient method and/or system for anti-icing is desired.

BRIEF SUMMARY OF THE INVENTION

In one aspect, a method is provided for assembling a gas turbine engine. The method includes providing an air inlet including an air filter assembly to a core engine within the gas turbine engine. The air inlet is oriented to channel air into the core engine. An exhaust flue including a radiating portion is coupled to the core engine. The exhaust flue is oriented to channel exhaust gases from the core engine. The exhaust flue is positioned within the air inlet such that the radiating portion is oriented to emit infrared radiation towards the air filter assembly.

In another aspect, an exhaust flue is provided for use with a gas turbine engine including a core engine and an air inlet including an air filter assembly. The exhaust flue is oriented to channel exhaust gases from the core engine. The exhaust flue includes a radiating portion positioned within the air inlet such that the radiating portion is oriented to emit infrared radiation towards the air filter assembly.

In yet another aspect, a turbine engine is provided. The turbine engine includes a core engine, an air inlet, and an exhaust flue. The core engine includes an upstream portion and a downstream portion. The air inlet includes an air filter assembly. The air inlet is coupled to the upstream portion of the core engine to channel ambient air into the core engine. The exhaust flue includes a radiating portion positioned within the air inlet. The exhaust flue is coupled to the downstream portion of the core engine to channel exhaust gases from the core engine. The radiating portion is oriented to emit infrared radiation towards the air filter assembly.

BRIEF DESCRIPTION OF THE DRAWINGS

FIG. 5 is a schematic view of the gas turbine engine including an exemplary air inlet and an exemplary exhaust flue oriented to emit infrared radiation within the air inlet;

FIG. 6 is a first perspective cross-sectional view of the air inlet shown in FIG. 5; and FIG. 7 is a second perspective cross-sectional view of the air inlet shown in FIG. 5.

DETAILED DESCRIPTION OF THE INVENTION

Figure 1:
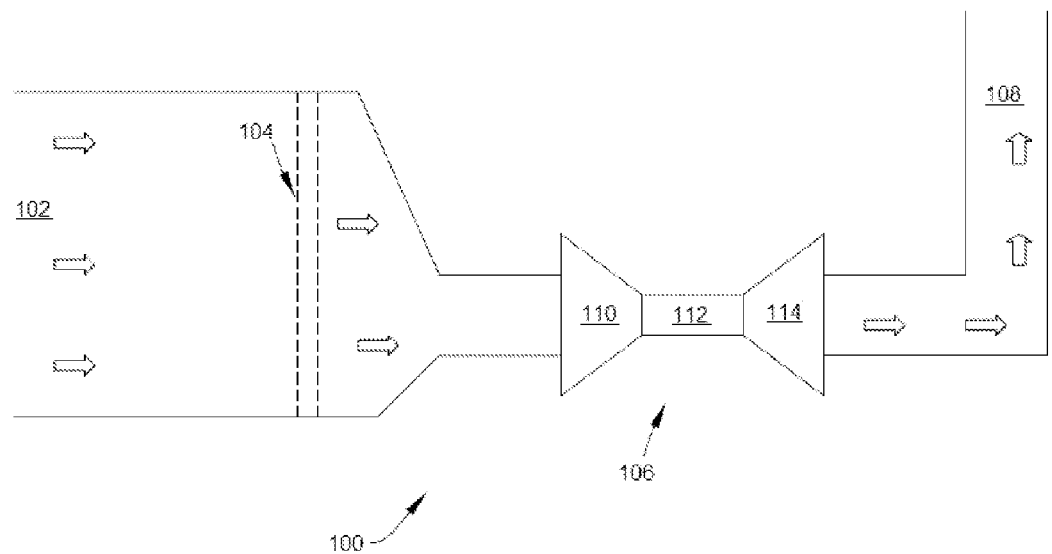
FIG. 1 is a schematic view of an exemplary gas turbine engine.

The methods and systems described herein facilitate improving anti-icing within a gas turbine engine and, more specifically, within an air inlet by using an exhaust flue to emit infrared radiation within the air inlet.

FIGS. 1-5 are schematic views of exemplary gas turbine engines 100, 200, 300, 400, and 500. Gas turbine engines 100, 200, 300, 400, and 500 are substantially similar in that each includes, in serial flow arrangement, an air inlet 102 including an air filter assembly 104, a core engine 106, and an exhaust flue 108. In the exemplary embodiment, core engine 106 includes a compressor 110, a combustor assembly 112 including a plurality of combustors (not shown), and a turbine 114.

During operation, ambient air is channeled through air inlet 102 and air filter assembly 104 towards core engine 106 and, more specifically, compressor 110. Air filter assembly 104 filters the ambient air to facilitate protecting core engine 106 from dust and/or other debris entrained in the ambient air entering air inlet 102.

Compressor 110 compresses the air, and the compressed air is discharged from compressor 110 into combustor assembly 112, wherein the compressed air is mixed with fuel and ignited within combustor assembly 112 to generate combustion gases. The combustion gases are then discharged towards turbine 114, wherein turbine 114 converts thermal energy from the combustion gases into mechanical rotational energy used to drive a rotor shaft (not shown).

Exhaust gases are discharged from turbine 114 through exhaust flue 108 and into the atmosphere downstream from gas turbine engine 100. Generally, the exhaust gases discharged from gas turbine engine 100 have a temperature that is higher than a temperature of the intake air entering air inlet 102.

Gas turbine engine 100 differs from gas turbine engines 200, 300, 400, and 500 in that gas turbine engine 100 does not include an anti-ice system. Rather, gas turbine engines 200, 300, 400, 500 each include different embodiments of anti-ice systems. More specifically, gas turbine engine 200 includes an anti-ice rake 202 that channels compressed air from core engine 106 to air inlet 102, gas turbine engine 300 includes a heat exchanger system 302 that transfers heat to air inlet 102, gas turbine engine 400 includes a lamp assembly 402 that emits heat from within air inlet 102, and gas turbine engine 500 includes an exhaust flue 502 oriented to emit infrared radiation within air inlet 102.

Figure 2:
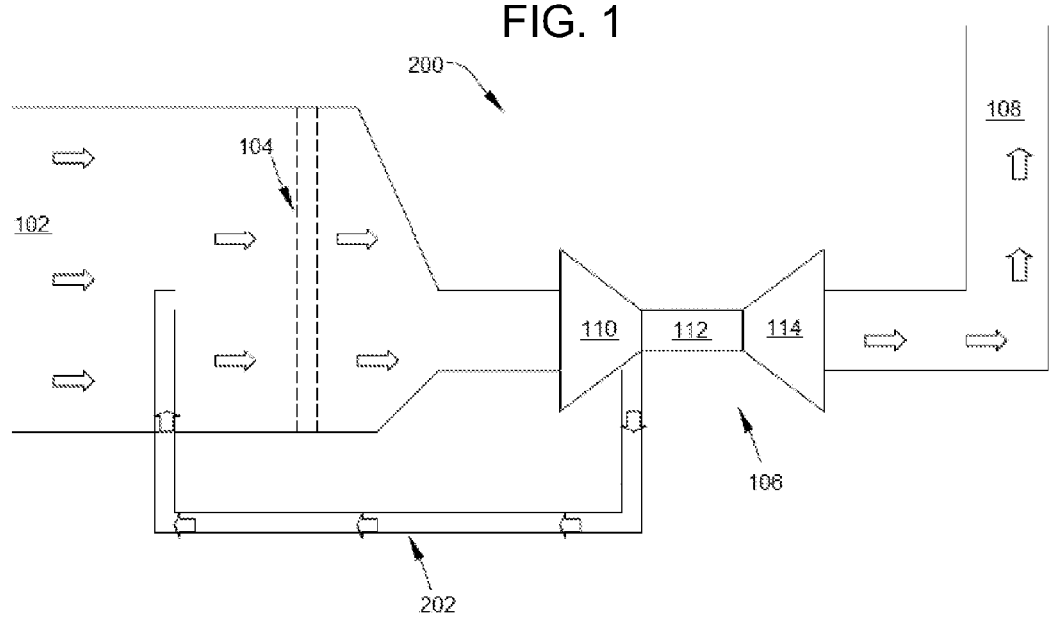
FIG. 2 is a schematic view of the gas turbine engine including an exemplary anti-ice rake.

In the embodiment illustrated in FIG. 2, anti-ice rake 202 channels compressed air from core engine 106 to air inlet 102. More specifically, in the exemplary embodiment, at least some compressed air is extracted from compressor 110, channeled through anti-ice rake 202, and supplied to air inlet 102. Generally, the compressed air directed to air inlet 102 through rake 202 is at a temperature that is higher than a temperature of the intake air entering air inlet 102. Notably, extracting compressed air from compressor 110 reduces an overall mass flow and/or operating pressure of gas turbine engine 200.

Figure 3:
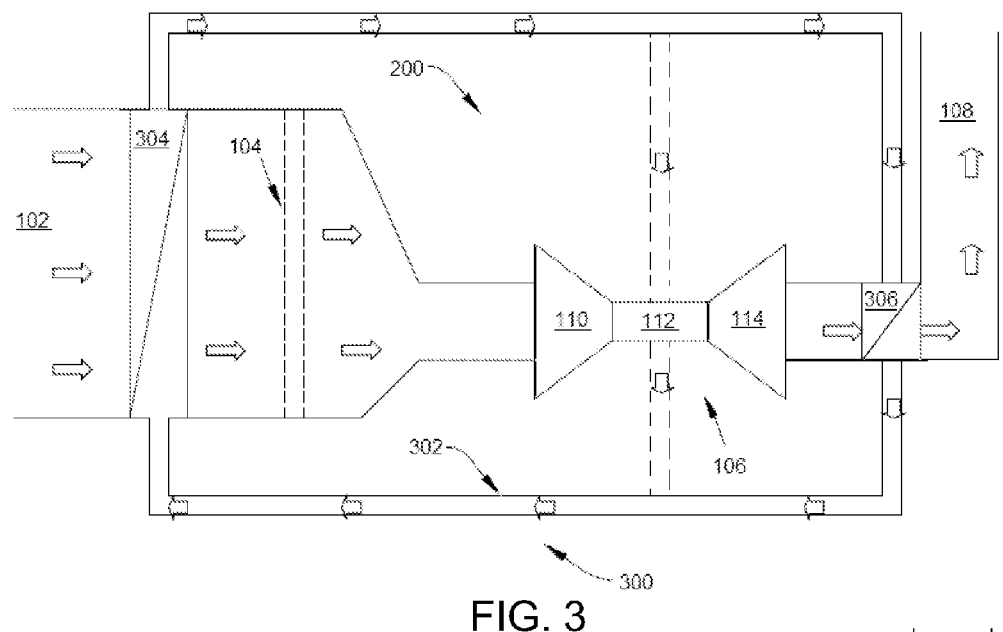
FIG. 3 is a schematic view of the gas turbine engine including an exemplary heat exchanger system.

In the embodiment illustrated in FIG. 3, heat exchanger system 302 includes an inlet cross-flow heat exchanger ("inlet heat exchanger") 304 and an exhaust cross-flow heat exchanger ("exhaust heat exchanger") 306. More specifically, in the exemplary embodiment, inlet heat exchanger 304 is positioned within air inlet 102, and exhaust heat exchanger 306 is positioned within exhaust flue 108. Alternatively, exhaust heat exchanger 306 may be positioned within core engine 106. In the exemplary embodiment, heat exchanger system 302 circulates fluid between inlet heat exchanger 304 and exhaust heat exchanger 306. More specifically, in the exemplary embodiment, at exhaust heat exchanger 306, heat is transferred from the exhaust gases discharged from turbine 114 to the fluid channeled through heat exchanger system 302. Heated fluid within heat exchanger system 302 is channeled from exhaust heat exchanger 306 to inlet heat exchanger 304, wherein, at air inlet 102, heat is transferred from inlet heat exchanger 304 to the intake air. Notably, the heat transferred between heat exchangers 304 and 306 is inefficient, i.e., some heat is lost between the exhaust gases from turbine 114 and the fluid channeled through heat exchanger system 302 and/or between exhaust heat exchanger 306 and inlet heat exchanger 304. Alternatively, transferring heat via heat exchangers 304 and 306 when exhaust heat exchanger 306 is positioned within core engine 106 may reduce an operating pressure within gas turbine engine 300.

Figure 4:
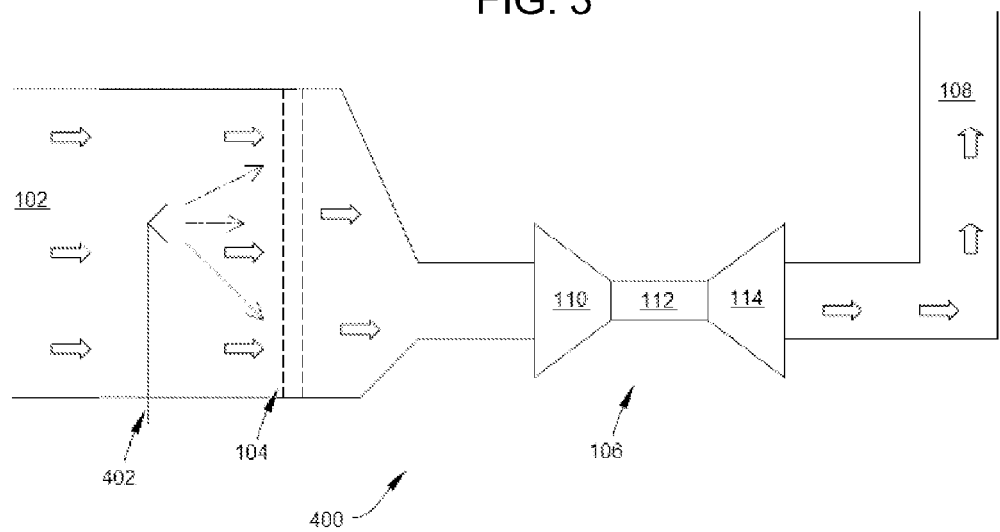
FIG. 4 is a schematic view of the gas turbine engine including an exemplary lamp assembly.

In the embodiment illustrated in FIG. 4, lamp assembly 402 emits radiation within air inlet 102. More specifically, in the exemplary embodiment, lamp assembly 402 emits infrared radiation towards air filter assembly 104. Notably, lamp assembly 402 requires an additional energy source to emit infrared radiation.

In the embodiment illustrated in FIG. 5, exhaust flue 502 includes a radiating potion 504 including a surface area that emits infrared radiation within air inlet 102 substantially perpendicularly towards air filter assembly 104.

FIG. 6 is a first cross-sectional view of air inlet 102 from the perspective of first side 506. FIG. 7 is a second cross-sectional view of air inlet 102 from the perspective of air filter assembly 104.

Exhaust flue 502 is oriented to channel exhaust gases from gas turbine engine 100 through air inlet 102. More specifically, exhaust flue 502 is oriented to channel exhaust gases from gas turbine engine 100 through air inlet 102 from a first side 506 of air inlet 102 to a second side 508 of air inlet. In the exemplary embodiment, air inlet 102 has a width 510 from first side 506 to second side 508 of about 2.4 meters (m). In the exemplary embodiment, exhaust flue 502 is positioned to be substantially perpendicular to first side 506 and/or second side 508. Additionally, in the exemplary embodiment, exhaust flue 502 is positioned to be substantially parallel to air filter assembly 104.

In the exemplary embodiment, exhaust flue 502 and, more specifically, radiating portion 504 is positioned upstream from air filter assembly 104. In the exemplary embodiment, exhaust flue 502 is substantially cylindrical and has a diameter 512 that is smaller than a height 514 of air inlet 102 to enable intake air to flow around exhaust flue 502 toward air filter assembly 104. More specifically, in the exemplary embodiment, diameter 512 of exhaust flue 502 is about 1.0 m and height 514 of air inlet 102 is about 3.0 m. A height 516 of radiating portion 504 is dependent on a distance 518 from radiation portion 516 to air filter assembly 104. In the exemplary embodiment, height 516 is about 0.5 m.

In the exemplary embodiment, exhaust flue 502 is fabricated from a stainless steel material having an emissivity of about 0.8. Alternatively, exhaust flue 502 may have any shape or size or be fabricated from any material that enables gas turbine engine 500 to function as described herein.

During operation, ambient air enters air inlet 102 and is channeled around exhaust flue 502 and towards air filter assembly 104. Radiating portion 504, which has a temperature that is higher than the intake air entering air inlet 102, emits infrared radiation to transfer heat to at least a portion of air inlet 102 and/or air filter assembly 104 in the vicinity of radiating portion 504. For example, in the exemplary embodiment, a wall of radiating portion 504 is maintained at about 417° C. (783° F.). Heating air filter assembly 104 facilitates heating the air channeled therethrough.

A magnitude of radiation heat transfer from radiating portion 504 to air filter assembly 104 may be calculated using the following equation:

$$Q_r = If \cdot A \cdot E \cdot (T_1^4 - T_2^4) \quad \text{(Eq. 1)}$$

wherein:
  $Q_r$=radiated heat;
  $If$=Stefan Boltzman constant=$5.67 \times 10^{-8}$;
  A=surface area of emitting surface emitting normally to receiving surface;
  E=emissivity of emitting surface;
  $T_1$=temperature of emitting surface; and
  $T_2$=temperature of receiving surface.

In the exemplary embodiment, radiating portion 504 is the emitting surface and air filter assembly 104 is the receiving surface. For example, in the exemplary embodiment, an estimated magnitude of radiation heat transfer from radiating portion 504 to filter assembly 104 may be calculated as follows:

$$Q_r = 5.67 \times 10^{-8} \cdot 2.4 \times 0.5 \cdot 0.8 \cdot (700^4 - 273^4) = 12766 \text{ Watts.} \quad \text{(Eq. 2)}$$

In the exemplary embodiment, the intake air is then channeled through air filter assembly 104 to facilitate protecting core engine 106 from entrained debris in the ambient air and reducing the formation of ice within air inlet 102 and, more specifically, air filter assembly 104.

The filtered air is channeled towards core engine 106, which discharged exhaust gases from turbine 114 through exhaust flue 502. Generally, the exhaust gases discharged from gas turbine engine 100 have a temperature that is higher than a temperature of the intake air entering air inlet 102. Exhaust flue 502 channels the exhaust gases through radiating portion 504, which transfers heat to at least a portion of air inlet 102 and/or air filter assembly 104 in the vicinity of radiating portion 504, as described above. Accordingly, gas turbine engine 500 provides an efficient system and/or method for anti-icing without reducing an overall mass flow and/or operating pressure of gas turbine engine 500.

Exemplary embodiments of a gas turbine engine including an anti-icing system and methods for assembling a gas turbine engine including an anti-icing system are described above in detail. The methods and systems are not limited to the specific embodiments described herein, but rather, components of the methods and systems may be utilized independently and separately from other components described herein. For example, the methods and systems described herein may have other industrial and/or consumer applications and are not limited to practice with gas turbine engines as described herein. Rather, the present invention can be implemented and utilized in connection with many other industries.

As used herein, an element or step recited in the singular and proceeded with the word "a" or "an" should be understood as not excluding plural said elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for assembling a gas turbine engine, said method comprising: providing an air inlet including an air filter assembly to a core engine within the gas turbine engine, wherein the air inlet is oriented to channel air into the core engine; and the air inlet is upstream of the core engine; coupling an exhaust flue including a radiating portion to the core engine, wherein the exhaust flue is oriented to channel exhaust gases from the core engine; and positioning the exhaust flue within the air inlet such that substantially all of the exhaust gases within the air inlet are confined within the radiating portion of the exhaust flue, and the exhaust flue extends at least partially within the air inlet, wherein the radiating portion is oriented to emit infrared radiation towards the air filter assembly and such that the exhaust gases are channeled out of the air inlet via the exhaust flue.

2. A method in accordance with claim 1, wherein positioning the exhaust flue further comprises extending the exhaust flue between a first side of the air inlet to an opposing second side of the air inlet.

3. A method in accordance with claim 2, wherein extending the exhaust flue further comprises orienting the exhaust flue to be substantially perpendicular to at least one of the first and second sides.

4. A method in accordance with claim 1, wherein extending the exhaust flue further comprises orienting the exhaust flue to be substantially parallel to the air filter assembly.

5. A method in accordance with claim 1, wherein positioning the exhaust flue further comprises positioning the radiating portion upstream from the air filter assembly.

6. A method in accordance with claim 1, wherein providing an air inlet further comprises providing the air inlet having a first diameter, and wherein coupling an exhaust flue further comprises providing the exhaust flue having a second diameter that is smaller than the first diameter.

7. An exhaust flue for use with a gas turbine engine including a core engine and an air inlet including an air filter assembly, said air inlet located upstream of the core engine, said exhaust flue oriented to channel exhaust gases from the core engine, said exhaust flue comprising a radiating portion within the air inlet such that substantially all of the exhaust gases within the air inlet are confined within said radiating portion of said exhaust flue, said exhaust flue extends at least partially within the air inlet, and wherein said radiating portion is oriented to emit infrared radiation towards the air filter assembly and such that the exhaust gases are channeled out of the air inlet via the exhaust flue.

8. An exhaust flue in accordance with claim 7, wherein said exhaust flue extends between a first side of the air inlet to an opposing second side of the air inlet.

9. An exhaust flue in accordance with claim 8, wherein said exhaust flue is oriented to be substantially perpendicular to at least one of the first and second sides.

10. An exhaust flue in accordance with claim 7, wherein said exhaust flue is oriented to be substantially parallel to the air filter assembly.

11. An exhaust flue in accordance with claim 7, wherein said radiating portion is positioned upstream from the air filter assembly.

12. An exhaust flue in accordance with claim 7, wherein said exhaust flue has a diameter that is smaller than a diameter of the air inlet.

13. A turbine engine comprising: a core engine comprising an upstream portion and a downstream portion; an air inlet comprising an air filter assembly, said air inlet coupled to said upstream portion of said core engine to channel ambient air into said core engine; said air inlet located upstream of the core engine; and an exhaust flue comprising a radiating portion positioned within said air inlet such that the exhaust flue extends at least partially within the air inlet, said exhaust flue coupled to said downstream portion of said core engine to channel exhaust gases from said core engine, wherein substantially all of the exhaust gases within the air inlet are confined within said radiating portion of said exhaust flue, said radiating portion oriented to emit infrared radiation towards said air filter assembly, said exhaust flue configured to channel the exhaust gases out of said air inlet.

14. A turbine engine in accordance with claim 13, wherein said exhaust flue extends between a first side of said air inlet to an opposing second side of said air inlet.

15. A turbine engine in accordance with claim 14, wherein said exhaust flue is oriented to be substantially perpendicular to at least one of said first and second sides.

16. A turbine engine in accordance with claim 13, wherein said exhaust flue is oriented to be substantially parallel to said air filter assembly.

17. A turbine engine in accordance with claim 13, wherein said radiating portion is positioned upstream from said air filter assembly.

18. A turbine engine in accordance with claim 13, wherein said air inlet has a first diameter and said exhaust flue has a second diameter that is smaller than the first diameter.

* * * * *